(12) United States Patent
Hooper et al.

(10) Patent No.: US 8,713,569 B2
(45) Date of Patent: Apr. 29, 2014

(54) DYNAMIC ASSOCIATION AND DISASSOCIATION OF THREADS TO DEVICE FUNCTIONS BASED ON REQUESTOR IDENTIFICATION

(75) Inventors: Donald F. Hooper, Shrewsbury, MA (US); Peter Barry, Ardnacrusha (IE); Praveen Mosur, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1230 days.

(21) Appl. No.: 11/902,947

(22) Filed: Sep. 26, 2007

(65) Prior Publication Data

US 2009/0083743 A1   Mar. 26, 2009

(51) Int. Cl.
*G06F 9/46* (2006.01)
*G06F 9/50* (2006.01)

(52) U.S. Cl.
USPC .......................................... 718/102; 718/100

(58) Field of Classification Search
None
See application file for complete search history.

(56) References Cited

U.S. PATENT DOCUMENTS

| | | | |
|---|---|---|---|
| 6,182,183 B1 * | 1/2001 | Wingard et al. | 710/305 |
| 6,418,442 B1 * | 7/2002 | Dwyer, III | 707/747 |
| 6,661,794 B1 * | 12/2003 | Wolrich et al. | 370/394 |
| 6,938,252 B2 * | 8/2005 | Baylor et al. | 718/102 |
| 6,947,425 B1 * | 9/2005 | Hooper et al. | 370/394 |
| 6,952,824 B1 * | 10/2005 | Hooper et al. | 718/100 |
| 6,996,639 B2 * | 2/2006 | Narad | 710/52 |
| 7,082,104 B2 * | 7/2006 | Wolrich et al. | 370/236 |
| 7,113,985 B2 * | 9/2006 | Narad et al. | 709/221 |
| 7,477,641 B2 * | 1/2009 | Jain et al. | 370/389 |
| 2002/0021804 A1 * | 2/2002 | Ledzius et al. | 380/44 |
| 2002/0178317 A1 * | 11/2002 | Schmisseur et al. | 710/305 |
| 2002/0196798 A1 * | 12/2002 | Isokangas et al. | 370/411 |
| 2003/0046511 A1 * | 3/2003 | Buch et al. | 712/1 |
| 2003/0147409 A1 * | 8/2003 | Wolrich et al. | 370/412 |
| 2004/0059828 A1 * | 3/2004 | Hooper et al. | 709/238 |
| 2004/0083317 A1 * | 4/2004 | Dickson et al. | 710/22 |
| 2004/0252709 A1 * | 12/2004 | Fineberg | 370/412 |
| 2005/0018601 A1 * | 1/2005 | Kalkunte et al. | 370/229 |
| 2005/0138130 A1 * | 6/2005 | Pilkington | 709/206 |
| 2005/0149744 A1 * | 7/2005 | Sydir et al. | 713/189 |
| 2006/0075406 A1 * | 4/2006 | Sinha | 718/100 |
| 2006/0130062 A1 * | 6/2006 | Burdick et al. | 718/100 |
| 2006/0150165 A1 * | 7/2006 | Hooper et al. | 717/140 |
| 2006/0268871 A1 * | 11/2006 | Van Zijst | 370/390 |

* cited by examiner

*Primary Examiner* — Meng An
*Assistant Examiner* — Benjamin Wu
(74) *Attorney, Agent, or Firm* — Grossman, Tucker, Perreault & Pfleger, PLLC

(57) ABSTRACT

A system apparatus and method for supporting one or more functions in an IO virtualization environment. One or more threads are dynamically associated with, and executing on behalf of, one or more functions in a device.

17 Claims, 2 Drawing Sheets

DYNAMIC ASSOCIATION AND DISASSOCIATION OF THREADS TO DEVICE FUNCTIONS BASED ON REQUESTOR IDENTIFICATION

BACKGROUND OF THE INVENTION

Consolidation is a technological trend aimed, among other things, at lowering total cost of ownership (TCO) as well as increasing performance of computing platforms. Virtualization is becoming a popular solution for consolidation, e.g. consolidation of datacenter servers. Virtualization based on virtual machine (VM) technology is becoming the preferred choice for such consolidation. With VM technology, a single physical machine may support concurrent operation of a number of operating systems, referred to as guest operating systems in the art, each of which possibly running over its own virtual machine representing the underlying physical machine. For example, a number of instances of Windows, Linux and Mac OS operating systems may run concurrently on the same physical machine. A single physical server machine may support tens of virtual machines (VMs), where each virtual machine (VM) may host multiple guest operating systems (OS) and where further each OS may have multiple applications running on it. Consolidation, for example by VM technology, may allow numerous applications that may otherwise require multiple, dedicated physical servers, to share a single physical server. Consolidation may allow the number of servers in a datacenter to be reduced while increasing average utilization of physical servers.

Input/output virtualization (IOV) is a technology that may enable multiple systems, e.g. multi-CPU systems, and/or multiple operating systems to simultaneously and/or concurrently share input/output (IO) resources. For example, multiple guest operating systems in a virtual machine (VM) environment may share a peripheral component interconnect (PCI), or a PCI Express (PCIe) subsystem. However, in the case of, for example, PCIe, IOV may require queuing of service requests and/or duplication of resources.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1A:
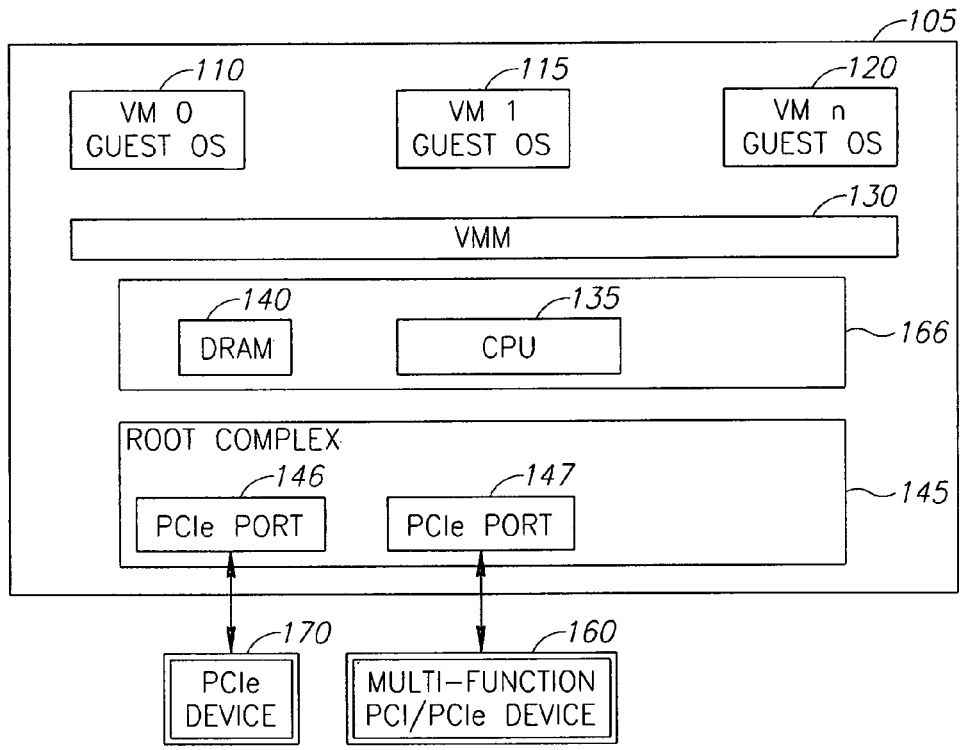
FIG. 1A shows some of the main blocks of a virtualized platform that may be used to implement embodiments of the present invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

A data process is here, and generally, considered to be a self-consistent sequence of acts or operations on data leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Unless explicitly stated, the method embodiments described herein are not constrained to a particular order or sequence. Additionally, some of the described method embodiments or elements thereof can occur or be performed at the same point in time.

Input/output virtualization (IOV) may comprise a part of a virtualization of a physical machine in the computing environment. IOV may enable sharing input/output (IO) devices. Such devices may be, and often are, connected to a physical platform by a peripheral component interconnect (PCI) subsystem. Typically, virtualization of a PCI subsystem comprises defining base, PCI and/or virtual functions that may represent, or act as proxies to, the connected devices. In addition, a typical environment has a set of functions defined for each entity sharing the PCI subsystem.

Reference is now made to FIG. 1A showing some components of a typical IOV topology that may be used in accordance with embodiments of the present invention. Hosting platform 105 may be connected to Input/Output (IO) devices 160 and 170. In the configuration depicted in FIG. 1, exemplary IO devices 160 and 170 may be devices such as, but not limited to, network cards (NICs), memory expansion devices or storage devices. IO devices 160 and 170 may be connected to root complex 145. Hosting platform may further comprise a central processing unit (CPU) subsystem 166, subsystem 166 may comprise CPU 135 and a memory subsystem 140. Root complex 145 may provide an interface between CPU subsystem 166 and IO devices 160 and 170. Root complex 145 may interface IO devices 160 and 170 through ports 146 and 147 respectively. Although FIG. 1A shows IO devices 160 and 170 as PCIe devices, it should be noted that other devices such as, but not limited to, PCI devices, PCI-X devices or any other suitable devices may be used in conjunction, and/or according to, embodiments of the invention.

Virtual machine monitor (VMM) 130 may provide the software abstraction layer between the physical platform and the guest operating systems (OS) 110, 115 and 120. Guest operating system 110, 115 and 120 may be, for example, any of MS Windows OS, Linux OS, Solaris, Mac OS, or any other suitable operating system. Guest operating systems may run concurrently on the same hardware platform, possibly sharing IO devices 160 and 170.

Figure 1B:
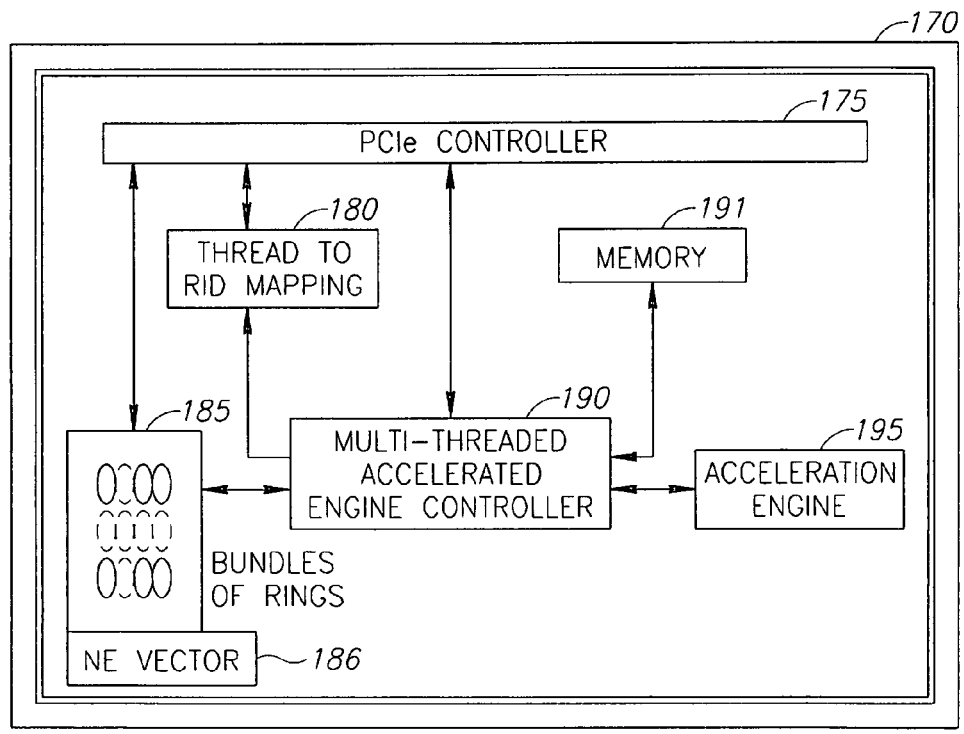
FIG. 1B shows a schematic block diagram according to some embodiments of the invention.

Reference is now made to FIG. 1B showing an IO device according to some embodim ents of the invention. Device 170 may be an IO device such as, but not limited to, a network interface card (NIC), a memory expansion card, a storage device or any other suitable IO device. Device 170 may be a peripheral component interconnect (PCI) device, an extended peripheral component interconnect (PCI-X) device or peripheral component interconnect express (PCIe) device. In case, for example, of a PCIe device, PCIe controller 175 may provide an interface between device 170 and a hosting platform. In other embodiments of the invention, device 170 may be of a type other than PCI, PCI-X or PCIe, in such case, controller 175 may be replaced by a suitable controller without departing from the scope of the invention.

According to some embodiments of the invention, threads may be organized as a pool of software, hardware, and/or hardware assisted execution threads. In other embodiments of the invention, functions, procedures, tasks or any other suitable hardware, software or a combination of hardware and software entities may be used instead of threads which are being described herein as an exemplary part of an exemplary embodiment.

According to some embodiments of the invention, bundles of rings 185 may be used to store transactions from the hosting platform to device 170 as well as possibly transactions from device 170 to the hosting platform. Rings 185 may comprise multiple message queues arranged into logical or physical rings. In other embodiments of the invention, rings 185 may comprise buffer chains, or any other suitable software, hardware or a combination of software and hardware. According to some embodiments of the invention, rings 185 may be logically or physically arranged into, or associated with, bundles. Bundles may further be associated with virtual functions (VFs), base functions or PCI functions.

In some embodiments of the invention, association of bundles of rings to functions may be static, for example, association may be done at an initial configuration phase. In some embodiments of the invention, a user may determine the number of rings, as well as which rings to be associated with each bundle. According to some embodiments of the invention, a user, or administrator, may further determine which bundles will be associated with each function. In other embodiments of the invention, association of bundles of rings, or subset of rings to functions may be dynamic.

According to some embodiments of the invention, non-empty (NE) status vector 186 may record the non-empty (NE) status of some or all rings in some or all bundles. The NE vector 186 may be updated upon changes made to rings, for example when data is stored in an empty ring, a corresponding entry in the NE vector may be updated to reflect that the specific ring, and/or the corresponding bundle is not empty. Accordingly, if data extraction from a ring leaves the ring and/or the corresponding bundle empty, the NE vector may be updated to reflect the ring and/or the corresponding bundle is now empty. In some embodiments of the invention, the NE vector may be replaced by a suitable entity, such as but not limited to, table, register, software structure or any other suitable software, hardware or a combination of software and hardware without departing from the scope of the invention.

It should be noted that bundles of rings 185 may be replaced by any other suitable structure, logic and/or mechanism without departing from the scope of the invention. For example, a buffer linked list, message queues and mechanism, or a message passing mechanism and/or logic may be employed in other embodiments of the invention.

According to some embodiments of the invention, rings or bundles of rings may be used to support various features such as, but not limited to, priorities, quality of service (QoS), or service level agreement (SLA). For example, a user may allocate rings, or bundles of rings to some functions in ways such that specific guest operating systems may be provided with higher bandwidth than other guest operating systems, or a system administrator may allocate rings, or bundles of rings such that disk operations will be ensured a predefined throughput. In some embodiments of the invention, a priority mechanism may be provided. For example, subsets of bundles of rings may be assigned different priorities, consequently, associated functions may be given priority according to the priority as well as number of associated bundles of rings.

Thread to requester identification (RID) mapping 180 may be used in some embodiments of the invention to record a temporary association, or mapping, of a thread to a requester identification (RID). A RID, as known in the art, may be a unique identifier associated with a specific virtual function, a base function or a PCI function of a virtualized device. A RID associated with a function may be used in order to map memory and/or perform other operations in a virtualized environment. For example, an interrupt or direct memory access (DMA) mapping in root complex 145 and/or subsystem 166 may use RID in order to map DMA operations to the appropriate memory, guest operating system and/or application.

According to some embodiments of the invention, threads may be dynamically associated with a RID. When associated with a specific RID, a thread may perform the tasks associated with the function associated with that specific RID. In some embodiments of the invention, upon associating itself with a specific RID, a thread may update mapping 180 to reflect the association. In some embodiments of the invention, an entry reflecting an association of a thread to a RID in mapping 180 may be updated prior to performing a series of tasks associated with a specific RID (and consequently, on behalf of a specific function). Mapping 180 may be used by a thread, for example when performing a transaction of data to the hosting platform. A thread, or another entity functioning on behalf of a thread, may extract the appropriate RID from mapping 180 and further attach the RID to a transaction of data to the hosting platform, the RID attached to a transaction may be used by hosting platform in order to map the transaction to the correct memory address as described earlier.

Mapping 180 may be for example, a table, a register, or other suitable, software and/or hardware entity, capable of storing and/or providing thread to RID association information. In addition to thread to RID association, mapping 180 may store and provide additional information, For example, information pertaining to the function associated with the RID or information pertaining to how data transfers should be performed.

According to some embodiments of the invention, engine controller 190 may perform, or be involved in, tasks such as, but not limited to, execution, coordination, scheduling, arbitration, supervising and/or management of threads operation, memory access, access to rings 185, access to controller 175, access to mapping 180 and/or operation and access to acceleration engine 195. In addition, controller 190 may be involved in tasks such as device 170 configuration, status reporting, device 170 initialization and the like. According to some embodiments of the invention, memory 191 may store thread executable code, configuration parameters and/or other data and parameters required for the operation of device 170.

According to some embodiments of the invention, acceleration engine 195 may perform tasks such as data encryption, data decryption, data compression and/or data decompression. For example, if device 170 is a network interface card, then data received from a connected network may be encrypted, for example, in the case of a secured socket layer (SSL) connection. In such case, engine 195 may perform the actual decryption of data before data is transferred to the hosting platform. In other cases, for example, when data received may be compressed, engine 195 may perform the decompression operation.

Figure 2:
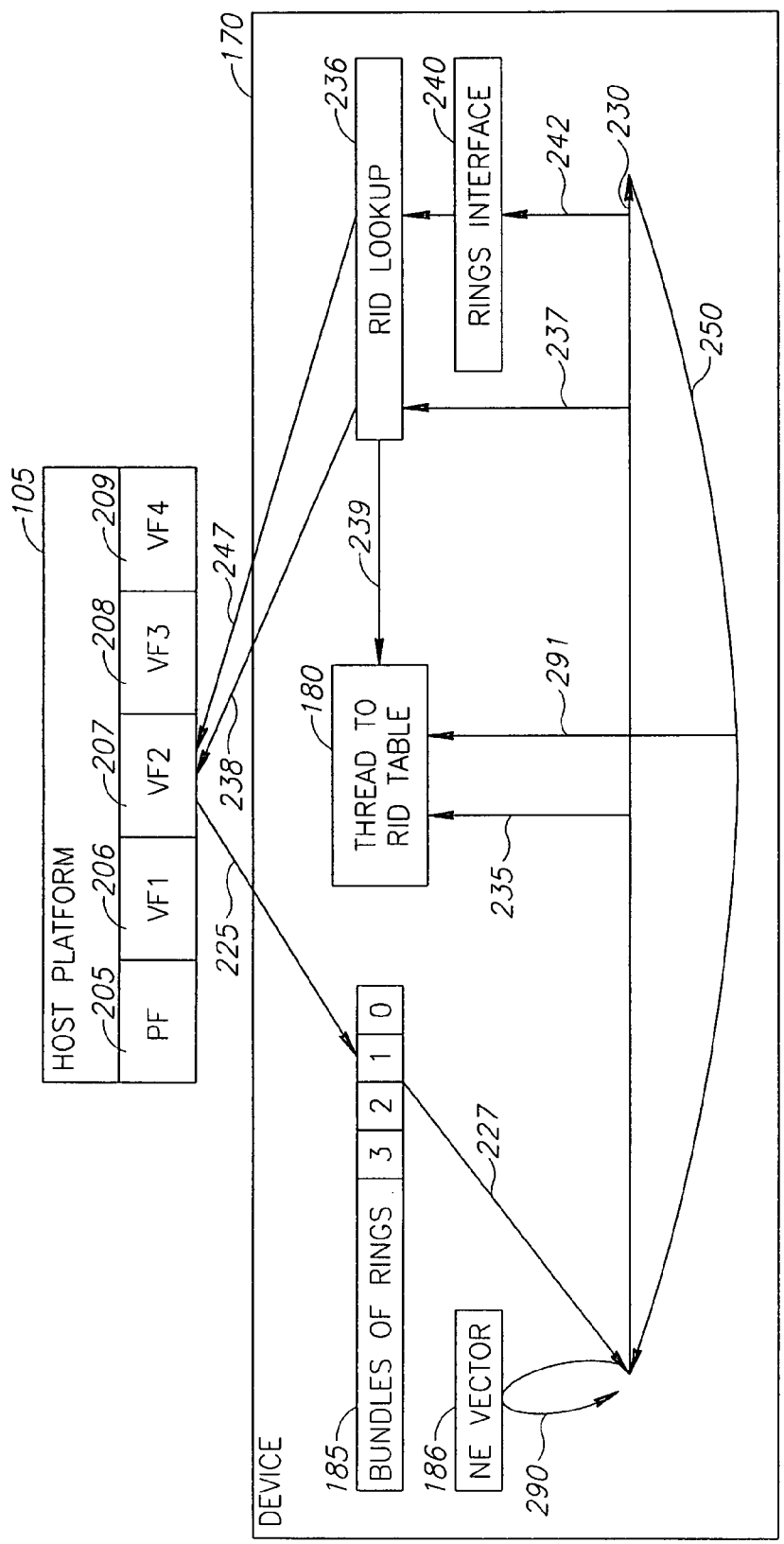
FIG. 2 shows schematic blocks and flows according to some embodiments of the invention.

Reference is now made to FIG. 2 showing some schematic, functional blocks and flows of some embodiments of the invention. Host platform 105 as described above may further comprise exemplary physical function (PF) 205 as well as exemplary virtual functions VF1 206, VF2 207, VF3 208 and VF4 209. In some embodiments of the invention, physical functions, PCI functions and virtual functions may be defined for virtualized devices according to the IOV special interest group (SIG) specifications.

According to some embodiments of the invention, functions may be mapped to bundles of rings, for example, virtual function I (VF1) may be mapped to bundle 0, VF2 may be mapped to bundle 1, and VF3 may be mapped to bundle 2. Multiple threads may be running in parallel and simultaneously on device 170, when idle, namely, not associated with any RID, bundle or VF, these threads may continuously check NE vector 186 for a change in a state of one or more bundles state (arrow 290).

According to some embodiments of the invention, accessing device 170 from host platform 105 may be done through some VF, for example one of exemplary virtual functions VF1 206, VF2 207, VF3 208 or VF4 209. For example, an application may use VF2 to transfer data to device 170. As described earlier, VF2 may be mapped to bundle 1, consequently, data may be written to one or more rings of bundle 1 (arrow 225). If prior to the storing of data within rings of bundle 1, bundle 1 was empty, then NE vector 186 may be updated to reflect the change from empty to non-empty state of bundle 1. Thread 230 may detect the change in NE vector 186 (arrow 227). Thread 230 may further update table 180 (arrow 235) to reflect an association between thread 230 and bundle 1. According to some embodiments of the invention, while associated to bundle 1, when thread 230 needs to transfer data to host platform 105, it may do so via RID lookup 236 (arrow 237), thread 230 may provide its thread number to RID lookup 236, RID lookup 236 may retrieve the correct RID by scanning, querying or by other interaction with thread to RID mapping 180 (arrow 239). RID lookup may further attach the RID to the data being transferred and transfer the data to host platform 105 (arrow 238). A mapping mechanism or logic in host platform 105 may map the supplied RID to the correct function, in the current example, to VF2.

According to embodiments of the invention, ring interface module 240 may be used by threads to access bundles of rings 185. For example, when a threads needs to store data within a specific ring it may do so by accessing the ring through ring interface module 240, for example by providing ring interface module 240 with a ring number and a buffer containing data to be stored within the specified ring. In other cases, threads may extract data from a ring by providing ring interface module 240 with a ring number and a buffer address to receive data.

According to embodiments of the invention, while associated with a bundle, a thread may also handle interrupts associated with the associated bundle. For example, thread 230 may handle interrupts associated with bundle I while associated with bundle 1. Upon catching an interrupt, thread 230 may store data associated with the interrupt (arrow 242) in a transmit, or response ring of bundle 1. An interrupt indication may be created by the ring interface 240 or by thread 230 the interrupt indication may be associated with a bundle number, in this example, bundle 1, or the thread number associated with the bundle, in this example, thread number of thread 230. The interrupt indication may be routed to RID lookup 236, as described earlier, RID lookup may retrieve the relevant RID, attach the RID to the interrupt indication and communicate the interrupt combined with the RID to the host platform (arrow 247). Mechanism and/or logic at the host platform may use the RID associated with the received interrupt in order to handle the interrupt correctly, for example, in the context of the appropriate function, in the current example, VF2.

According to some embodiments of the invention, when a thread completes servicing a function, possibly having extracted all data from the associated rings, it may revert back to idle state (arrow 250) which may comprise updating thread to RID mapping 180 (arrow 291), where the entry associating the thread with a specific RID may be cleared, and further continuously checking NE statue vector 186 as described earlier (arrow 290).

Although FIG. 2 only shows a single exemplary thread 230, it should be understood that according to embodiments of the invention, multiple threads may run concurrently, and in parallel on device 170. The number of threads running on device 170 may be predefined in some embodiments of the invention or it may correspond to the number of functions in other embodiments of the invention, for example, the number of threads may be half of the functions associated with a device. Multiple threads may enable embodiments of the invention to support multiple functions in parallel while maintaining low consumption of resources such as, but not limited to, memory, computing resources and/or power consumption.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. An article of manufacture for use in a computer system, the article of manufacture comprising a non-transitory computer readable storage medium having computer readable program code stored in the medium, that when executed causes a controller to:
   store data in at least one bundle of rings of a plurality of bundle of rings, wherein the at least one bundle of rings is associated with a respective function of a host platform, and wherein the respective function is further associated with a requestor identification (RID);
   detect, by one of a plurality of threads, whether the at least one bundle of rings contains data and, upon detecting that the at least one bundle of rings contains data, associate the one thread with the at least one bundle of rings and with the RID corresponding to the at least one bundle of rings;
   perform tasks related to the stored data by the associated one thread based on the RID associated with the respective function; and
   upon completion of the tasks, disassociate the one thread from the at least one bundle of rings and from the RID corresponding to the at least one bundle of rings.

2. The article of claim 1, wherein the computer readable program code when executed causes the controller to:
   associate two or more threads with two or more respective bundles of rings, and concurrently execute the two or more threads.

3. The article of claim 1, wherein the bundles of rings are a construct selected from the group consisting of: rings of buffers, buffers chains, queues, message queues, linked lists of buffers, and referenced memory structures.

4. The article of claim 1, wherein the plurality of threads are hardware assisted threads.

5. The article of claim 1, wherein the program code further contains instructions that when executed cause the one thread to use an acceleration engine.

6. The article of claim 1, wherein each of the at least one bundle of rings is statically bound to a respective function.

7. A device comprising:
   a processor; and
   a controller, executing on the processor, configured to:
     store data in at least one bundle of rings of a plurality of bundle of rings, wherein the at least one bundle of rings is associated with a respective function of a host platform, and wherein the respective function is further associated with a requestor identification (RID);
     detect, by one of a plurality of threads, whether the at least one bundle of rings contains data and, upon detecting that the at least one bundle of rings contains data, associate the one thread with the at least one bundle of rings and with the RID corresponding to the at least one bundle of rings;
     perform tasks related to the stored data by the associated one thread based on the RID associated with the respective function; and
     upon completion of the tasks, disassociate the one thread from the at least one bundle of rings and from the RID corresponding to the at least one bundle of rings.

8. The device of claim 7, further comprising:
   a status vector to reflect an empty/non-empty state of each of the at least one bundles of rings,
   wherein the device is further configured to detect whether the at least one bundle of rings contains data based at least in part on the empty/non-empty state of each of the at least one bundles of rings as indicated by the status vector.

9. The device of claim 7, further comprising:
   a table to store association of the one thread to the at least one bundles of rings,
   wherein the controller is further configured to perform tasks related to the stored data by routing the stored data according to the association stored in the table.

10. The device of claim 7, wherein the device is a peripheral component interconnect (PCI).

11. The device of claim 10, wherein the PCI is selected from the group consisting of: peripheral component interconnect extended (PCI-X), peripheral component interconnect express (PCIe), single root input/output virtualization (SR-IOV) PCIe, and multi root input/output virtualization (MR-IOV) PCIe.

12. A method comprising:
   storing data in at least one bundle of rings of a plurality of bundles of rings, wherein the at least one bundle of rings is associated with a respective function of a host platform, and wherein the respective function is further associated with a requestor identification (RID);
   detecting, by one of a plurality of threads, whether the at least one bundle of rings contains data and, upon detecting that the at least one bundle of rings contains data, associate the one thread with the at least one bundle of rings and with the RID corresponding to the at least one bundle of rings;
   performing tasks related to the stored data by the associated one thread based on the RID associated with the respective function; and
   upon completion of the tasks, disassociating the one thread from the at least one bundle of rings and from the RID corresponding to the at least one bundle of rings.

13. The method of claim 12, further comprising:
   associating two or more threads with two or more respective bundles of rings, and concurrently executing the two or more threads.

14. The method of claim 12, wherein detecting whether the at least one bundle of rings contains data comprises detecting an empty/non-empty state of each of the at least one bundles of rings.

15. The method of claim 12, wherein the performing tasks related to the stored data comprises routing the stored data according to the association of the one thread to the at least one bundle of rings that is stored in a table.

16. The method of claim 12, further comprising associating one or more functions with a respective one or more bundle of rings.

17. The method of claim 12, wherein each of the at least one bundle of rings is statically bound to a respective function.

* * * * *